United States Patent [19]

Koubecky

[11] 4,363,021
[45] Dec. 7, 1982

[54] SWITCHING DEVICE FOR MOTOR VEHICLE ANTI-THEFT SYSTEM

[75] Inventor: Vladimir Koubecky, Cologne, Fed. Rep. of Germany

[73] Assignee: Felten & Guilleaume GmbH, Cologne, Fed. Rep. of Germany

[21] Appl. No.: 195,338

[22] Filed: Oct. 8, 1980

[30] Foreign Application Priority Data

Oct. 19, 1979 [DE] Fed. Rep. of Germany ....... 2942252
Apr. 30, 1980 [DE] Fed. Rep. of Germany ....... 3016593

[51] Int. Cl.³ .............................................. B60R 25/10
[52] U.S. Cl. .................... 340/65; 340/52 H; 340/689; 200/61.47; 200/61.52
[58] Field of Search .................. 340/52.4, 61, 63, 65, 340/669, 686, 689; 200/61.47, 61.52, 61.45 R

[56] References Cited

U.S. PATENT DOCUMENTS 1,866,596  7/1932  Hendrickson .................... 200/61.47
3,030,477  4/1962  Hensley .......................... 200/61.47
4,129,852  12/1978  Knecht ........................... 200/61.47

FOREIGN PATENT DOCUMENTS 639693  7/1950  United Kingdom .
1038557  8/1966  United Kingdom .
1233467  5/1971  United Kingdom .
1369226  10/1974  United Kingdom .
1475706  6/1977  United Kingdom .

*Primary Examiner*—Alvin H. Waring
*Attorney, Agent, or Firm*—Meyer, Tilberry & Body

[57] ABSTRACT

An anti-theft system for a motor vehicle comprises an electrically-powered alarm, a switching device for actuating the alarm, and an electrical circuit connecting the switching device and the alarm. The switching device is attached to the motor vehicle and is provided with electrical contacts which automatically close the electrical circuit to actuate the alarm when the vehicle is in an inclined position.

24 Claims, 9 Drawing Figures

SWITCHING DEVICE FOR MOTOR VEHICLE ANTI-THEFT SYSTEM

This invention relates to an anti-theft system for a motor vehicle, and in particular to an anti-theft system having an electrically-powered alarm which is actuated by a switching device connected to a motor vehicle.

BACKGROUND

Anti-theft systems for motor vehicles are known that are equipped with electrical contacts which actuate the vehicle horn when an attempt is made to open the door. These known anti-theft systems are, however, only effective when unauthorized persons attempt to enter the vehicle. They do not respond upon removal of vehicle parts, particularly road wheels, which are accessible from the outside.

Anti-theft systems are also known which become effective when the vehicle is shaken or rocked. Although these known anti-theft systems set off the alarm when an unauthorized person interferes with the outside of the vehicle, they are very sensitive and also react to external influences that have nothing to do with attempts at theft, for example, when a heavy fast-moving vehicle passes close by, or when strong gusts of wind shake or rock the parked vehicle.

THE INVENTION

The aim of the present invention is to provide a simple, economical and reliable anti-theft system that responds when an attempt is made to remove the road wheels from the vehicle, or to load the entire vehicle onto another and to carry it away, the system not reacting, however, to innocent external influences.

The present invention provides an anti-theft system for a motor vehicle, the system comprising an electrically-powered alarm, a switching device for actuating the alarm, and an electrical circuit connecting the switching device and the alarm, the switching device being attached, in use, to the motor vehicle, wherein the switching device is provided with a housing defining a chamber which is partially filled with an electrically-conductive fluid, and with electrical contacts in the form of elongated immersible sensors which extend downwards into said chamber to differing extents, and which automatically close the electrical circuit when electrically connected by the fluid, when the vehicle is shifted into an inclined or differently inclined position.

This system offers the advantage that the alarm is not actuated by short-term vibrations of any kind. However, the alarm is reliably actuated when the vehicle is moved along an inclined surface or ramp onto another vehicle, or when the vehicle is tilted to one side, for example, for the purpose of removing a road wheel.

A switching device of this kind can be produced in a simple and economical manner and operates reliably. It can be fitted in a very small space and at practically any position on the vehicle, and the chamber can be filled to a level that exactly suits that inclined position of the particular vehicle that is necessary for raising a wheel of the vehicle from the gound. The same switching device can, therefore, be used for all types of vehicles.

The use of elongated, downwardly extending immersible sensors as contacts offers the advantage, among others, that point-contact is established at the bottom ends of the sensors, and surface leakage currents cannot occur along the inner wall of the housing when said fluid washes back from the contacts. In this arrangement, the lower end of each immersible sensor defines a certain level, up to which said fluid can rise when relatively pronounced tilting or inclination of the vehicle occurs.

Advantageously, the housing is a cup-shaped vessel whose top is closed off by a cover, and the sensors depend from the cover into said chamber and are connected to an electronic analysis device. The analysis device is so designed that it determines the initial orientation of the housing when the alarm is primed, and only actuates the alarm when the orientation or inclination of the housing is changed.

Preferably, there are a plurality of groups of sensors, the sensors of each group having the same length and the sensors of the different groups having different lengths, in which case the sensors of each group are connected by a common conductor to an electronic analysis device. Conveniently, one group of sensors extends into said chamber to terminate closely adjacent to the floor thereof. This ensures a reliable switching action, irrespective of the side to which the housing is tilted along with the vehicle.

The housing may be cylindrical, and the elongated sensors may be distributed on radial lines extending from the central axis of the housing. These lines may extend from the central axis of the housing in a star-like formation, and form with each other angles of 180°, 90° or, preferably, 120°. In this case, it is advantageous if the negative terminal of the switching device is connected to one immersible sensor which extends almost to the floor of the housing. This immersible sensor can be arranged in the central region or central axis of the housing.

Advantageously, the sensors of each group may be arranged at the corners of a substantially equilateral triangle centered on the housing axis. This results in great reliability in the switching action, irrespective of the direction in which the housing, along with the vehicle, is tilted.

Preferably, the sensors are arranged adjacent to the inner surface of the outer wall of the housing. This offers the advantage that the highest possible switching position is achieved, since, even when the vehicle is slightly inclined, the greatest fluctuation in fluid-level in the housing occurs at the outer wall and thus can be used for the switching operation. This is because each sensor in this case is electrically connected, via said fluid, with a more or less diametrically-opposed sensor which leads to the negative terminal and is more or less disposed diametrically opposite thereto.

Advantageously, the housing chamber is of annular form, the chamber being adjacent to the outer wall of the housing and surrounding a cylindrical inner or central chamber which accommodates the electronic analysis device. This arrangement offers the advantage that relatively little electrically-conductive fluid is needed within the fluid-containing chamber. It also has the advantage of accommodating the analysis device within the protection of the housing interior. A further advantage is that the leads from the immersible sensors to the analysis device are very short.

When use is made of an annular fluid-containing chamber, the immersible sensors are expediently distributed around this chamber in a circle. Such an arrangement is easy to produce, and guarantees fluid-tight, mutually-insulated seats for the individual sensors in the cover. Moreover, the leads running to the sensors can extend or be passed, in a fluid-tight manner, through the cover and into the interior of the housing.

Advantageously, the fluid-containing chamber is divided into a plurality of chamber parts or compartments by means of upright divider walls, the divider walls being so formed that the chamber compartments are in fluid communication with each other. Preferably, the divider walls are arranged to be immersible in the electrically-conductive fluid, and to terminate adjacent to i.e., spaced a short distance from the floor of the housing.

The immersible divider walls extending into the electrical-conductive fluid allow said fluid to rise and fall at only a moderate rate when the vehicle, and thus the housing, is swung or rocked back and forth. This is because the fluid can only flow between the chamber compartments through the passageways below the immersible divider walls. Splashing of the fluid is thus suppressed, since the surface area of the fluid is relatively small in each of the chamber compartments. The immersible divider walls may extend upwardly as far as the cover of the housing.

Preferably, there are four walls arranged at right-angles to each other. This is particularly advantageous where the chamber is annular, as the immersible divider walls divide the chamber into a plurality of segmental or arcuate chamber compartments, each of which contains immersible sensors. Advantageously, the housing is attached, in use, to the motor vehicle in such a manner that each of the chamber divider walls is inclined, i.e. horizontally angled to the longitudinal axis of the vehicle. Thus, maximum damping down of fluctuations in the fluid level during shaking or rocking movements of the vehicle is achieved both in the longitudinal and the transverse directions.

Various electrically-conductive fluids can be used in the switching device, provided they are able to retain their electrically-conductive properties in the temperature range prescribed. Triphenylchloromethane or triphenylfluoromethane may be used as the electrically-conductive fluid. It is preferable, however, for the fluid to contain a metal salt, and a mixture of glycerine and copper sulphate is particularly suitable. A fluid of this kind possesses a certain viscosity and flows in a relatively inert or slow manner, so that movements in the fluid level are also relatively slow.

DRAWINGS

Several forms of switching device, for use in anti-theft systems constructed in accordance with the invention, will now be described, by way of example, with reference to the accompanying drawings, in which.

PREFERRED EMBODIMENTS

Figure 1:
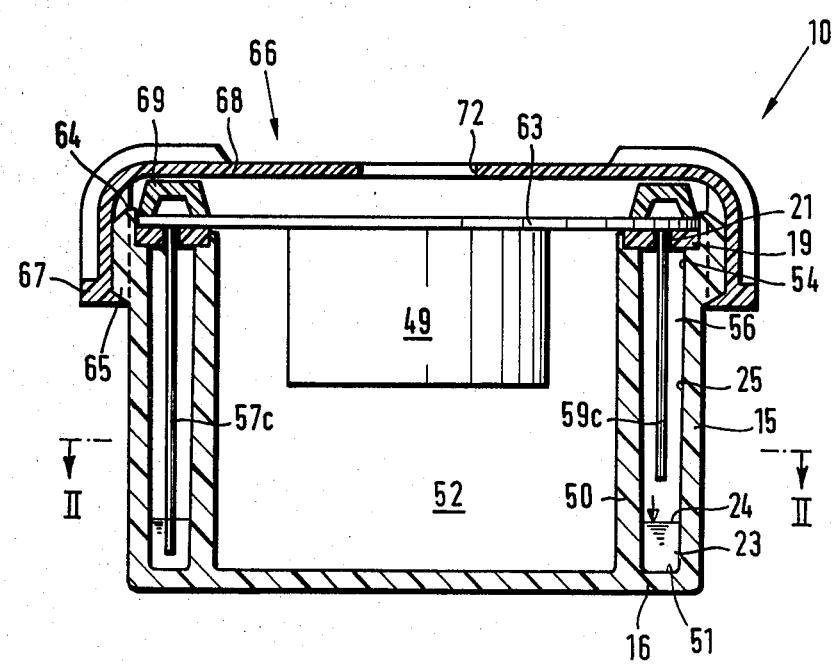
FIG. 1 is a vertical cross-section through a first form of switching device comprising the invention.
Figure 2:
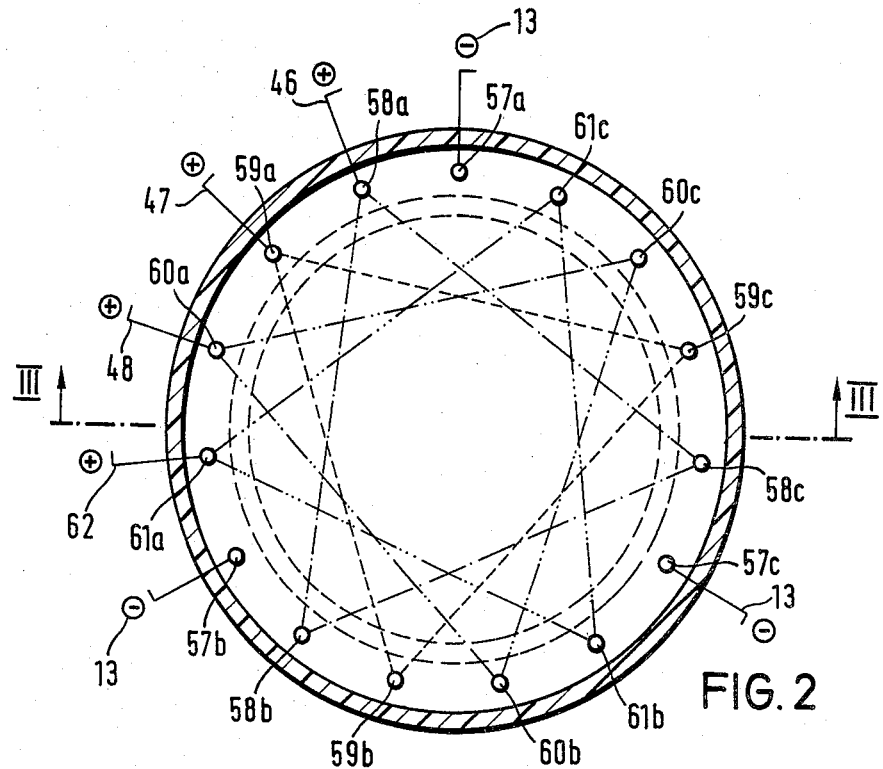
FIG. 2 is a cross-section taken on the line II—II of FIG. 1, the electronic analysis device of the switching device being omitted from this figure.

Referring to the drawings, FIGS. 1 and 2 show a first form of switching device 10 according to the invention having a hollow, cup-shaped cylindrical housing 14, the cylindrical wall 15 and the floor 16 of which are made of an electrically non-conductive material, for example a polyethylene or polypropylene plastics material.

Figure 3:
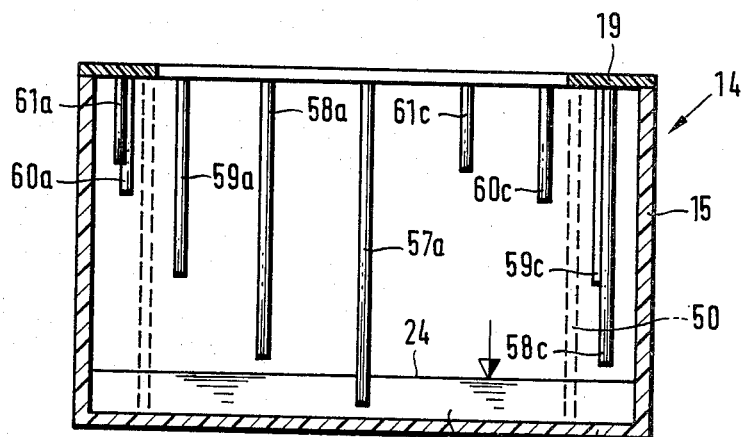
FIG. 3 is a cross-section taken on the line III—III of FIG. 2.

As shown in FIGS. 1 to 3, the housing 14 has an inner cylindrical wall 50 concentric with the outer cylindrical wall 15. The two cylindrical walls 15 and 50 define an annular chamber 56 which accommodates a partial filling or body of an electrically-conductive fluid 23. This fluid may be, for example, a mixture of glycerine and copper sulphate, triphenylchloromethane or triphenylfluoromethane. The bottom of the chamber 56 is closed by a surface 51 which forms part of the housing floor 16. At the top, the chamber 56 is closed off by an annular cover 19, which fits between the outer wall 15 and the inner wall 50 in a fluid-tight manner. Preferably, the cover 19 is bonded or welded to the walls 15 and 50, so that a fluid-tight seal is obtained. The walls 15 and 50, the floor 16 and the cover 19 are made of a plastics material, for example polyethylene, which cannot be wetted by the fluid 23. Immersible sensors 57, 58, 59, 60 and 61 of generally rod-like form are arranged in the annular chamber 56, the sensors depending from the cover 19 and being sealed against the cover by sealing means 21. Three each of the immersible sensors 57 to 61 are provided, and the sensors are so distributed, in a circle, around and concentric with the annular chamber 56 that the three sensors of each group 57, 58, 59, 60 and 61 form the corners 57a, 57b, 57c; 58a, 58b, 58c; 59a, 59b, 59c; 60a, 60b, 60c; and 61a, 61b, 61c of respective of substantially equilateral triangles, which are indicated in FIG. 2 by different kinds of broken lines and are centered on the central axis of the chamber and angularly displaced therearound relative to one another. The immersible sensors 57 are all connected to a negative terminal 13, whereas the sensors of the groups 58, 59, 60 and 61 are connected, via conductors 46, 47, 48 and 62, respectively, to a conventional form of electronic analysis device 49 for the digital analysis of the orientation tilt of the housing 14. The electronic analysis device 49 is arranged in the interior or inner chamber 52 of the housing 14.

The conductors 13, 46, 47, 48 and 62, which are shown only diagrammatically in FIG. 2, are in fact in the form of a printed circuit provided on a conductor plate 63 which is disposed on the cover 19, so that the printed conductors make electrical contact with their corresponding immersible sensors 57 to 61 held in the cover 19.

As will be seen from FIG. 3, the immersible sensors 57 are long enough to extend into the fluid 23 even when the axis of the housing 14 is vertical. The immersible sensors of the groups 58 to 61, on the other hand, are shorter, but all of the sensors of each group 58, 59, 60 and 61, respectively, are of the same length, and their bottom ends, in each case, define a switching surface parallel to the floor 16. As can be seen from FIG. 3, the switching surfaces formed by the sensors 58, 59, 60 and 61 are at different levels or distances from the floor 16 all greater than the distance of the sensors 57 therefrom, which distances are, however, somewhat exaggerated in this Figure.

As shown in FIG. 1, the housing 14 is provided with a cap 66 having a peripheral dependent flange 67, which engages round a bead 65 formed around the upper outside edge 65 of the housing. A pressure ring 69 is provided between the top 68 of the cap 66 and the conductor plate 63, the pressure ring being of U-shaped cross-section and being made of resilient material, for example glass-fibre reinforced polypropylene. Thus, the conductor plate 63 is pressed firmly against the cover 19, by the compression of the pressure ring 69 between the conductor plate and the cap 66, so that an electrically-conductive connection is established between the conductive upper ends of the sensors 57 to 61 and respective printed circuit conductors on the conductor plate 63.

The electronic analysis device 49, which is secured to the lower face of the conductor plate 63, is connected through conductors (not shown) to an alarm (not shown), for example the horn of the vehicle. These conductors pass out of the cap 66 through a central opening 72 therein.

The switching device 10 is secured to a motor vehicle, at a suitable position thereon that is not accessible to unauthorized persons. Preferably, the switching device 10 is arranged so that the axis of its cylindrical housing 14 is vertical. Then, when the vehicle is parked and the alarm unit is primed, the analysis device 49 ascertains the particular set position or orientation, i.e. inclination, of the vehicle, this being defined by the sensors which are immersed in the fluid 23. If the vehicle, and therefore the switching device 10, is then tilted or shifted to a different oriented position, for example as a result of unauthorized persons raising one side of the vehicle so as to remove a road wheel, the position of the fluid level 24 changes in relation to the immersible sensors of the groups 58 to 61. For example, the fluid level 24 may change in such a way that, not only the sensors of group 58, but also those of group 59 are then contacted by the fluid 23. The analysis device 49 then closes the circuit of the alarm unit so that the alarm is set off.

Figure 4:
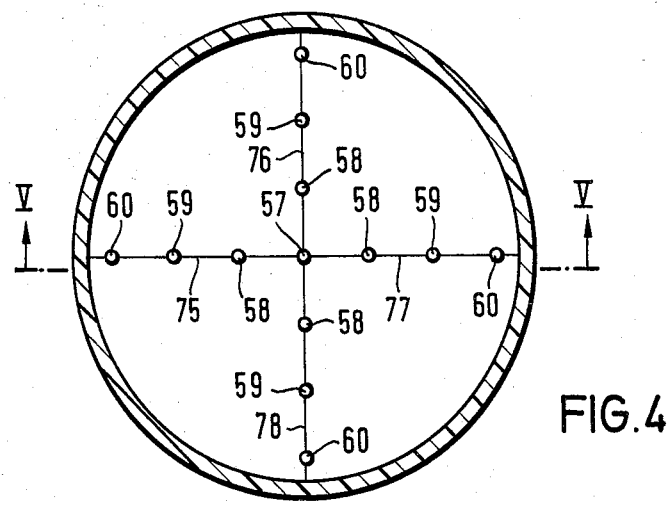
FIG. 4 is a horizontal cross-section of a second form of switching device of the switching device.
Figure 5:
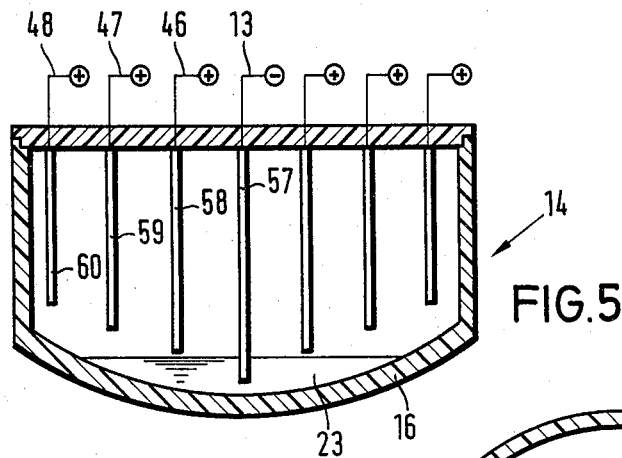
FIG. 5 is a cross-section taken on the line V—V of FIG. 4.

FIGS. 4 and 5 show a second form of switching device 10 whose housing 14 has a cylindrical wall 15 and a dished floor 16. An immersible sensor 57, connected to a negative terminal 13, is located in the central region or central axis of the housing 14, and extends into the body of electrically-conductive fluid 23 which covers part of the floor 16. Other sensors 58, 59 and 60 are arranged along radial lines 75, 76, 77 and 78 extending from the central axis of the housing 14. The lines 75 to 78 form angles of 90° with each other about the central axis of the housing and, in plan view, form a right-angled cross. Here again, the sensors of each group 58, 59 and 60 are connected to respective conductors 46, 47 and 48. In other respects, the switching device of FIGS. 4 and 5 is similar to that of FIGS. 1 to 3 and operates in a similar manner.

Figure 6:
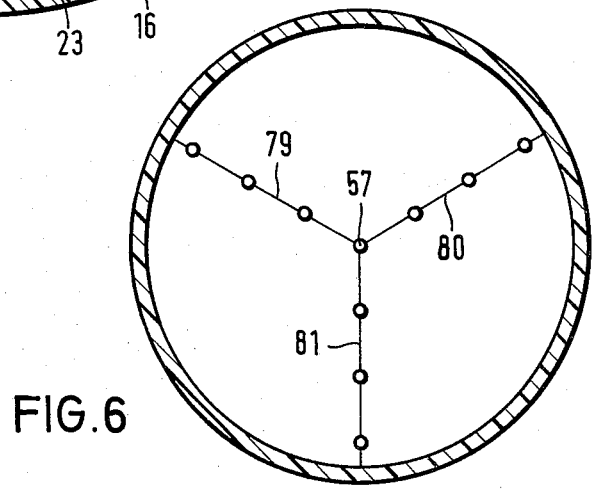
FIG. 6 is a horizontal cross-section of a third form of switching device of the switching device.

FIG. 6 shows a third form of switching device 10. This device is similar to that of FIGS. 4 and 5 in that its housing 14 is of the same shape as that of FIGS. 4 and 5, and in that a sensor 57, connected to a negative terminal 13, is located in the central region or central axis of the housing. The remaining sensors, however, are arranged along radial lines 79, 80 and 81, which are at angles of 120° to each other about the central axis of the housing. Here again, this switching device operates in a similar manner to that of the embodiment of FIGS. 1 to 3.

Figure 7:
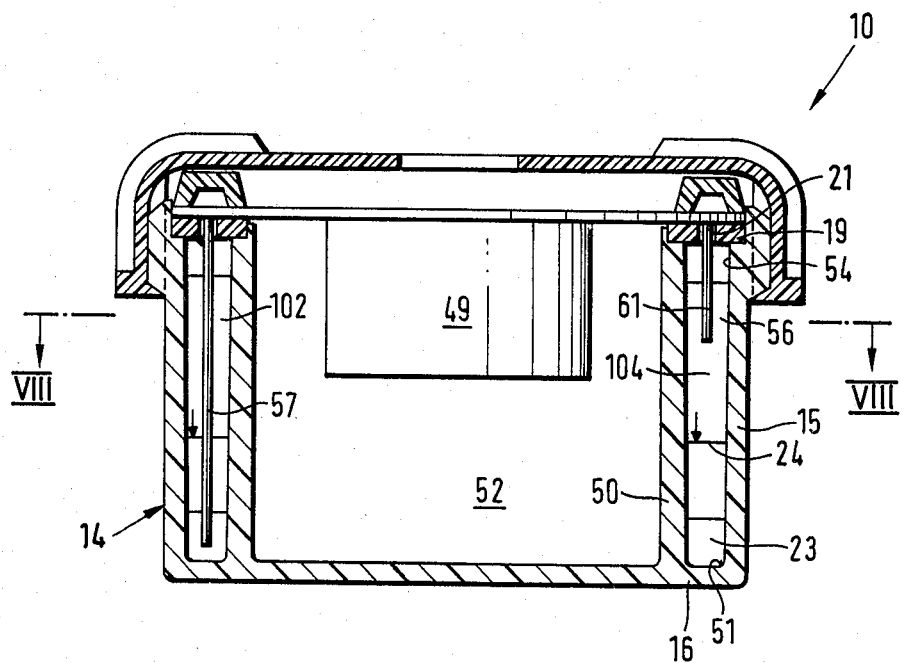
FIG. 7 is a vertical cross-section of a fourth form of switching device of the switching device.
Figure 8:
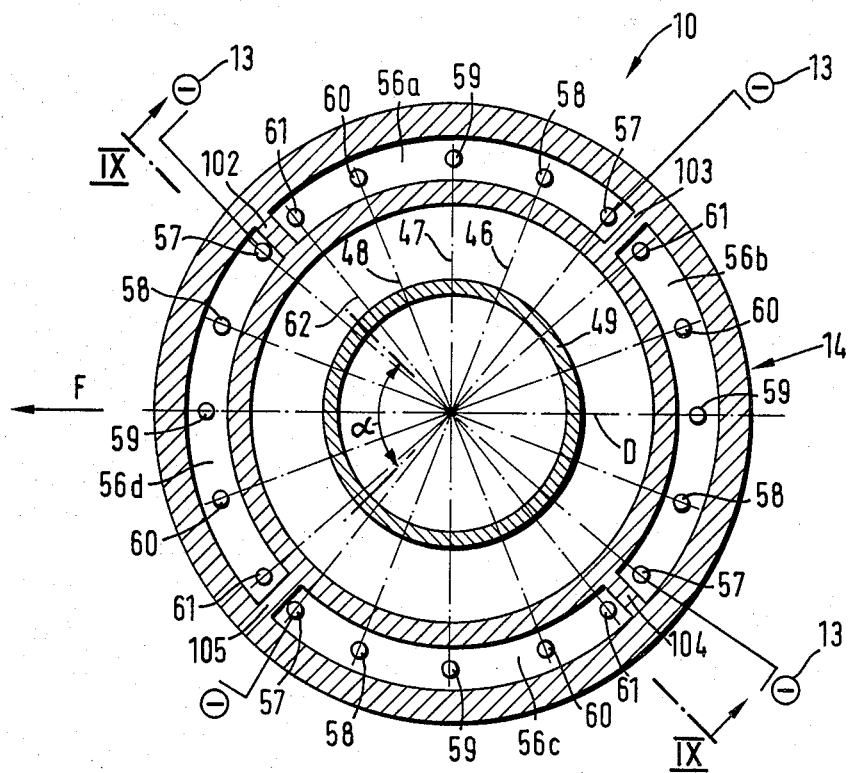
FIG. 8 is a cross-section taken on the line VIII—VIII of FIG. 7.

FIGS. 7 and 8 show a fourth form of switching device 10 according to the invention. In this embodiment, an annular chamber 56 is divided off in the housing 14 by a cylindrical inner wall 50, the chamber 56 accommodating a body of electrically-conductive fluid 23. Sensors 57 to 61 extend downwardly into the chamber 56 from the cover 19. The chamber 56 is divided by four immersible upright divider walls 102, 103, 104 and 105 into four segmental or arcuate chambers or compartments 56a, 56b, 56c and 56d. These immersible divider walls 102, 103, 104, 105 terminate at a short distance, i.e. are spaced from the floor 16 of the housing 14 so as to leave passageways between adjacent ones of the compartments 56a–56d, and they are immersed in the electrically-conductive fluid 23 the level of which is indicated by the numeral 24. The immersible divider walls 102 to 105 may extend up to the cover 19; however, in the arrangement shown, they terminate at, i.e. are spaced a short distance below the cover. As can be seen from FIG. 8, the four immersible divider walls 102 to 105 are arranged at angles of 90° to each other about the central axis of the housing 14, and preferably in such a way that they all extend at a horizontal angle of about 45° to the longitudinal axis, and thus to the normal straight-ahead direction of travel of the motor vehicle on which the switching device 10 is mounted, which direction is indicated by the arrow F.

The immersible divider walls 102 to 105 may be formed integrally with the cylindrical outer and inner side walls 15 and 50 of the housing 14. Alternatively, they may be bonded to the walls 15 and 50 or secured thereto in some other way.

Each segmental chamber 56a, 56b, 56c and 56d contains five immersible sensors 57, 58, 59, 60 and 61 of differing lengths and angularly spaced apart around the chamber axis, with the sensors of each group thereof angularly spaced approximately 90° apart around the chamber axis, as shown. All the sensors 57 to 61 are press-fitted into the cover 19, and are sealed thereagainst by means of a seal 21. The immersible sensors 57 have the greatest length so that their bottom ends lie closest to the housing floor 16, and they extend into the fluid 23 when the housing axis is vertical. The sensors 57 are all connected to the negative terminal 13 of the alarm circuit. The immersible sensors 58, 59, 60 and 61 in each pair of diametrically opposed segmental chambers 56a, 56, and 56b, 56d, are connected by conductors 46, 47, 48 and 62, respectively, to an electronic analysis device 49 for the digital analysis of the orientation or inclination of the housing 14. The analysis device 49 is disposed in the interior 52 of the housing 14. As with the embodiment of FIGS. 1 to 3, the conductors 46, 47, 48 and 62 are in the form of a printed circuit provided an the surface of the cover 63.

When a motor vehicle equipped with the switching device 10 of FIGS. 7 and 8 is parked and the alarm unit is primed, the level 24 of the fluid 23 in the housing 14 is detected by the sensors 57 to 61. If the vehicle, and therefore the housing 14, is then tilted, the fluid 23 touches other sensors, and, after a certain time-lag, the analysis device 49 sets off the alarm. If, on the other hand, the vehicle, and therefore the housing 14, is swung or rocked backwards and forwards, then, although the fluid level 24 alters, it assumes its original position again after a certain time, so that the alarm is not set off even though in the meantime other sensors have come into contact with the fluid. During the above-mentioned swinging moment, the movement of the fluid 23 in the housing 14 is retarded and damped down by the immersible divider walls 102, 103, 104 and 105 so that a surface wave of the fluid 23, which moves right around the annular chamber 56 and would cause a false alarm, cannot occur.

Figure 9:
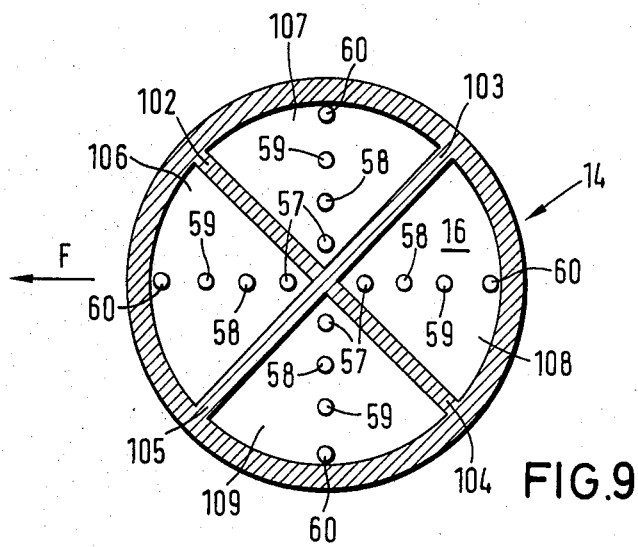
FIG. 9 is a horizontal cross-section of a fifth form of switching device of the switching device.

FIG. 9 shows a fifth form of switching device 10 according to the invention having immersible sensors 56, 58, 59 and 60 arranged in two rows crossing each other at right-angles in a hollow, cylindrical housing 14. The housing 14 is divided into four sectors 106, 107, 108 and 109 by immersible radial divider walls 102, 103, 104 and 105 which cross each other at right-angles at the center of the housing. The floor 16 of the housing 14 may be dished. The immersible sensors 57, which are connected to the negative terminal 13 of the alarm circuit, are located in the central region of the housing 14, and extend almost to the floor 16. Thus, in any position of the housing 14 they reach into the body of electrically-conductive fluid 23 which, as in FIG. 5, covers part of the housing floor 16. The sensors 58, 59 and 60 are shorter than the sensors 57 and of differing lengths, and they are interconnected by respective conductors which lead to the electronic analysis device 49. Thus, the sensors 58, 59 and 60 define switching surfaces at different levels in the housing 14, which levels are reached by the fluid in the housing when the vehicle is in an inclined position. The immersible divider walls 102 to 105 retard and damp down the movements of the fluid 23 when the vehicle is swung or rocked backwards and forwards.

I claim:

1. In a switching device to be used in an anti-theft system for a motor vehicle of the type having an electrically-powered alarm operated by said switching device, the improvement wherein said switching device comprises a housing defining a chamber with a floor and containing a partial filling of an electrically-conductive fluid, three or more electrical contacts in the form of elongated immersible sensors extending downwardly into said chamber to differing extents with at least one of said sensors being of a fixed extent longer than the others thereof and terminating adjacent to said floor of said housing and being immersed in said fluid filling when the vehicle is in a given set position, said sensors automatically closing an electrical path when any one of said sensors is electrically connected to said immersed sensor by the said fluid when the vehicle is tilted from said given set position to a detecting position.

2. An improvement as specified in claim 1 wherein the said housing is a cup-shaped vessel closed off at the top by a cover, and wherein the said sensors are connected to an electrical connector fixed with respect to said cover.

3. An improvement as specified in claim 2 wherein there are a plurality of groups of said sensors, the sensors of each group having the same length and the sensors of the different groups having different lengths to extend downwardly into the said chamber to different extents, and wherein the sensors of each said group are connected by a common conductor to said electrical connector.

4. An improvement as specified in claim 3 wherein the said housing is cylindrical and the said sensors are distributed along radial lines extending from the central axis of the housing and include at least one sensor of said given fixed extent located in the central region of said housing.

5. An improvement as specified in claim 3 wherein the sensors of each group are arranged at the corners of respective substantially equilateral triangles centered on a common center and angularly displaced therearound relative to one another.

6. An improvement as specified in either claim 2, 3 or 5 wherein the said cup-shaped vessel has an outer wall and the said sensors are arranged adjacent to the inner surface of the said outer wall of the vessel.

7. An improvement as specified in either claim 1, 2, 3 or 5 wherein said chamber is annular.

8. An improvement as specified in claim 3 wherein said chamber is annular and is adjacent to the outer wall of the said housing and surrounds a cylindrical inner chamber accommodating the said electrical connector.

9. An improvement as specified in either claim 3, 4, or 5 wherein said chamber has a central axis and is divided into a plurality of chamber compartments by means of upright radial divider walls, said divider walls being spaced from the housing floor so that the chamber compartments are in fluid communication with each other, and each of the sensors of each said group thereof being located in a different one of said chamber compartments and equidistantly from said chamber axis.

10. An improvement as specified in either claim 3 or 5 wherein said chamber is annular with a central axis and is divided into a plurality of chamber compartments by means of upright radial divider walls, said divider walls being immersed in said fluid filling and spaced from the housing floor so that the said chamber compartments are in fluid communication with each other, and each of the sensors of each said group thereof being located in a different one of said chamber compartments and equidistantly from said chamber axis.

11. An improvement as specified in either claim 3 or 5 wherein said chamber is annular and is adjacent to the outer wall of the housing and surrounds a cylindrical inner chamber accommodating the said electrical connector and wherein said annular chamber has a central axis and is divided into a plurality of chamber compartments by means of upright radial divider walls, said divider walls being immersed in said fluid filling and spaced from the housing floor so that the chamber compartments are in fluid communication with each other, and each of the sensors of each said group thereof being located in a different one of said chamber compartments and equidistantly from said chamber axis.

12. An improvement as specified in either claim 3, 4 or 5 wherein said chamber has a central axis and is divided into a plurality of chamber compartments by means of upright radial divider walls immersed in said fluid filling, said divider walls terminating adjacent to the floor of the said housing and extending upwardly as far as the said cover of the housing, and each of the sensors of each said group thereof being located in a different one of said chamber compartments and equidistantly from said chamber axis.

13. An improvement as specified in either claim 3 or 5 wherein said chamber is annular with a central axis and is divided into a plurality of chamber compartments by means of upright radial divider walls immersed in said fluid filling, said divider walls terminating adjacent to the floor of the said housing and extending upwardly as far as the said cover of the housing, and each of the sensors of each said group thereof being located in a different one of said chamber compartments and equidistantly from said chamber axis.

14. An improvement as specified in either claim 3 or 5 wherein said chamber is annular and is adjacent to the outer wall of the housing and surrounds a cylindrical inner chamber and wherein said annular chamber has a central axis and is divided into a plurality of chamber compartments by means of upright radial divider walls immersed in said fluid filling, said divider walls terminating adjacent to the floor of the said housing and extending upwardly as far as the said cover of the housing, and each of the sensors of each said group thereof being located in a different one of said chamber compartments and equidistantly from said chamber axis.

15. An improvement as specified in either claim 3 or 4 wherein said chamber has a central axis and is divided into a plurality of chamber compartments by means of four upright divider walls arranged at right-angles to each other, said divider walls being immersed in said fluid and spaced from the housing floor so that the chamber compartments are in fluid communication with each other, and each of the sensors of each said group thereof being located in a different one of said chamber compartments and equidistantly from said chamber axis.

16. An improvement as specified in either claim 3 or 4 wherein said chamber has a central axis and is divided into a plurality of chamber compartments by means of four upright divider walls arranged at right-angles to each other and immersed in said fluid filling, said divider walls terminating adjacent to the floor of the said housing and extending upwardly as far as the said cover of the housing, and each of the said sensors of each said group thereof being located in a different one of said chamber compartments and equidistantly from said chamber axis.

17. An improvement as specified in claim 3 wherein said chamber is annular with a central axis and is divided into a plurality of chamber compartments by means of four upright divider walls arranged at right-angles to each other and immersed in said fluid filling, said divider walls terminating adjacent to the floor of the said housing and extending upwardly as far as the said cover of the housing, and each of the said sensors of each said group thereof being located in a different one of said chamber compartments.

18. An improvement as specified in claim 17 wherein said annular chamber is adjacent to the outer wall of the said housing and surrounds a cylindrical inner chamber.

19. An improvement as specified in claim 17 wherein the sensors in each of said chamber compartments are angularly spaced apart therein around the said chamber axis, and the sensors of each said group thereof are angularly spaced approximately 90° apart around the said chamber axis.

20. An improvement as specified in claim 17 wherein the said housing is attached, in use, to the motor vehicle with each of the said divider walls extending at a horizontal angle of approximately 45° to the longitudinal axis of the vehicle.

21. An improvement as specified in either claim 3 or 4 wherein said chamber has a central axis and is divided into a plurality of compartments by means of four upright divider walls arranged at right angles to each other and immersed in said fluid filling, said divider walls terminating adjacent to the floor of the said housing and extending upwardly as far as the said cover of the housing, and each of the said sensors of each said group thereof being located in a different one of said chamber compartments and equidistantly from said chamber axis, said housing being attached, in use, to the motor vehicle with each of the said divider walls extending at a horizontal angle of approximately 45° to the longitudinal axis of the vehicle.

22. An anti-theft system for a motor vehicle, the system comprising an electrically-powered alarm, a switching device for actuating the alarm, and an electrical circuit connecting the switching device and the alarm, the switching device being attached, in use, to the motor vehicle, said switching device comprising a housing defining a chamber containing a partial filling of an electrically-conductive fluid, a plurality of electrical contacts in the form of elongated immersible sensors extending downwardly into said chamber to differing extents with at least one of said sensors being of a fixed extent longer than the others thereof and terminating adjacent to the floor of said housing and being immersed in said fluid filling when the vehicle is in a given set position, said sensors automatically closing the said electrical circuit to set off the alarm when a shorter one of said sensors is electrically connected to said immersed sensor by the said fluid when the vehicle is tilted from said given set position, said housing being a cup-shaped vessel closed off at the top by a cover, said sensors depending from said cover and being formed as a plurality of groups of sensors with the sensors of each group having essentially the same length, said sensors in different groups extending downwardly into said chamber to different extents, and wherein said chamber is annular and is adjacent to the outer wall of the said housing and defines a cylindrical inner element receiving chamber.

23. An anti-theft system for a motor vehicle, the system comprising an electrically-powered alarm, a switching device for actuating the alarm, and an electrical circuit connecting the switching device and the alarm, the switching device being attached, in use, to the motor vehicle, said switching device comprising a housing defining a chamber containing a partial filling of an electrically-conductive fluid, a plurality of electrical contacts in the form of elongated immersible sensors extending downwardly into said chamber to differing extents with at least one of said sensors being of a fixed extent longer than the others thereof and terminating adjacent to the floor of said housing and being immersed in said fluid filling when the vehicle is in a given set position, said sensors automatically closing the said electrical circuit to set off the alarm when a shorter one of said sensors is electrically connected to said immersed sensor by the said fluid when the vehicle is tilted from said given set position, said housing being a cup-shaped vessel closed off at the top by a cover, said sensors depending from said cover and being formed as a plurality of groups of sensors with the sensors of each group having essentially the same length, said sensors in different groups extending downwardly into said chamber to different extents, and wherein said chamber has a central axis and is divided into a plurality of chamber compartments by means of upright radial divider walls, said divider walls being spaced from the housing floor so that the chamber compartments are in fluid communication with each other, and each of the sensors of each said group thereof being located in a different one of said chamber compartments and equidistantly from said chamber axis.

24. An anti-theft system for a motor vehicle, the system comprising an electrically-powered alarm, a switching device for actuating the alarm, and an electrical circuit connecting the switching device and the alarm, the switching device being attached, in use, to the motor vehicle, said switching device comprising a housing defining a chamber containing a partial filling of an electrically-conductive fluid, a plurality of electrical contacts in the form of elongated immersible sensors extending downwardly into said chamber to differing extents with at least one of said sensors being of a fixed extent longer than the others thereof and terminating adjacent to the floor of said housing and being immersed in said fluid filling when the vehicle is in a given set position, said sensors automatically closing the said electrical circuit to set off the alarm when a shorter one of said sensors is electrically connected to said immersed sensor by the said fluid when the vehicle is tilted from said given set position, said housing being a cup-shaped vessel closed off at the top by a cover, said sensors depending from said cover and being formed as a plurality of groups of sensors with the sensors of each group having essentially the same length, said sensors in different groups extending downwardly into said chamber to different extents, and wherein said chamber is annular with a central axis and is divided into a plurality of chamber compartments by means of upright radial divider walls, said divider walls being immersed in said fluid filling and spaced from the housing floor so that the said chamber compartments are in fluid communication with each other, and each of the sensors of each said group thereof being located in a different one of said chamber compartments and equidistantly from said chamber axis.

* * * * *